(12) United States Patent
Rangavajjula et al.

(10) Patent No.: US 12,475,097 B2
(45) Date of Patent: Nov. 18, 2025

(54) ACCESS MANAGEMENT OF DATA OBJECTS IN DATABASES, INCLUDING MASSIVELY PARALLEL DATABASE PROCESSING SYSTEMS

(71) Applicant: Teradata US, Inc., San Diego, CA (US)

(72) Inventors: K N Sal Krishna Rangavajjula, AndhraPradesh (IN); Chandrasekhar Tekur, Andhra Pradesh (IN); Bhashyam Ramesh, Secunderabad (IN)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 17/565,932

(22) Filed: Dec. 30, 2021

(65) Prior Publication Data
US 2023/0214373 A1 Jul. 6, 2023

(51) Int. Cl.
*G06F 16/22* (2019.01)
(52) U.S. Cl.
CPC ................ *G06F 16/2282* (2019.01)
(58) Field of Classification Search
CPC .......... G06F 21/31; G06F 21/33; G06F 21/71; G06F 2221/2141; G06F 2221/2147; G06F 21/6245
USPC ........................................................ 707/825
See application file for complete search history.

(56) References Cited

U.S. PATENT DOCUMENTS

| | | | | |
|---|---|---|---|---|
| 7,289,964 | B1* | 10/2007 | Bowman-Amuah | ........................ G06F 9/5038 705/1.1 |
| 8,166,071 | B1* | 4/2012 | Korablev | .............. G06F 21/604 707/783 |
| 8,327,419 | B1* | 12/2012 | Korablev | .............. H04L 63/105 726/19 |
| 11,392,567 | B2* | 7/2022 | Wei | ..................... G06F 16/2282 |
| 11,599,514 | B1* | 3/2023 | Agrawal | ............. G06F 16/2282 |
| 2019/0334904 | A1* | 10/2019 | Lelcuk | ............... G06Q 20/0655 |
| 2021/0117487 | A1* | 4/2021 | Cole | ................... G06F 16/9532 |
| 2024/0086495 | A1* | 3/2024 | Gandhi | .............. G06F 11/3692 |

* cited by examiner

*Primary Examiner* — Hung T Vy
(74) *Attorney, Agent, or Firm* — Ramin Mahboubian

(57) ABSTRACT

Improved techniques for management of access in computing environments and systems are disclosed. An object-level data access mechanism can be provided. to effectively provide an object-level locking mechanism for locking data objects of database tables, individually, as individual data objects. Furthermore, the object-level data access mechanism can be provided as a safe and efficient filtering mechanism (e.g., cuckoo filter) that effectively provide an object-level locking mechanisms for locking data objects of a database table, individually (i.e., as individual locks placed on individual data objects). For example, a set of filters (e.g., write cuckoo and read cuckoo) can be provided for a database table to facilitate concurrent database operations in a safe but efficient manner.

20 Claims, 5 Drawing Sheets

ACCESS MANAGEMENT OF DATA OBJECTS IN DATABASES, INCLUDING MASSIVELY PARALLEL DATABASE PROCESSING SYSTEMS

BACKGROUND

In the context of computing environments and systems, data can encompass virtually all forms of information. Data can be stored in a computer readable medium (e.g., memory, hard disk). Data, and in particular, one or more instances of data can also be referred to as data object(s). As it is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the Relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important aspect of database systems is various database operations that they support and optimization of the database queries of the data stored in the database, as it is generally appreciated by those skilled in the art. One such database operation is generally known as a database Join operation (or "Join" as also may be referred to herein). For example, in a SQL environment, a SQL Join statement can be used to combine data or rows from two or more tables based on a common field between them. Different types of Joins include, INNER JOIN, LEFT JOIN, RIGHT JOIN and FULL JOIN. Simply put a Join operation can be used to effectively combine the information provided in database (e.g., as database tables) to address database quarriers. For example, in a database where a first database table provides information about students and their age, a second database table that provides information about the students and their favorite subjects and a third database that provides information about the students and their respective Grade Point Averages (GPA's), join operations can be suggestively applied to the tables to effectively join their information to address various database queries, including, for example, finding all the students that are age 19 with a GPA of 3.5 or higher that have "math" as their favorite subject, and so on.

A more recent development in database systems is the use of multi-processing computing or parallel computing system, especially Massively Parallel Processing (MPP) database systems that use a relatively large number of processing units to process data in parallel.

Another more recent development is the development of modern analytics (or data analytics) methods including, for example, statistical analytics, machine learning methods, discrete mathematics (e.g., graph analytics, deep learning). These modern analytics can be quite complex. As such, MPP database systems, among other things, are relatively much better suited for running (or executing modern analytics (or data analytics) methods.

Partly as a result of these more recent developments, there is an ever-increasing need for Relational Database to process increasingly more and more data for various applications in many existing computing environments and systems. For example, today, in a number of existing database environments, there is a need to execute (or run) thousands of database queries in parallel, or virtually simultaneously. Generally, managing access to data is an important aspect of computing systems. Managing access to data has become even more crucial today, especially for database systems that need to process more and more requests to access to data (e.g., database queries).

In view of the ever-increasing need to process more and more data for various applications in many different computing environments and systems, improved techniques for management of access to data in computing systems, especially in Massively Parallel Processing (MPP) database systems that need to safely and rapidly process concurrent data access requests, would be very useful.

SUMMARY

Broadly speaking, the invention relates to computing environments and systems. More particularly, the invention relates to improved techniques for management of access (or data access management) in computing environments and systems.

in accordance with one aspect, an object-level data access mechanism can be provided. the object-level data access mechanism can effectively provide an object-level locking mechanism for locking data objects of database tables, individually, as individual data objects.

In accordance with another aspect, an object-level accessing filtering mechanisms can be provided. The object-level accessing filtering mechanisms can also effectively provide an object-level locking mechanisms for locking data objects of a database table, individually (i.e., as individual locks placed on individual data objects). Moreover, the object-level accessing filtering mechanisms can be provided in a more efficient manner, as a space-efficient filtering mechanism that may allow false positives but not false negatives (e.g., a bloom filter, a cuckoo filter) thereby allowing secure but space efficient object-level locking mechanism for controlling access to each one of the multiple data objects of the database table, individually.

A set of filters (e.g., write and read) can be provided for a database table in accordance with yet another aspect. By way of example, a database management system can use a read cuckoo filter and a write cuckoo filter to facilitate concurrent database operations in a safe but efficient manner, in accordance with one embodiment.

Still other aspects, embodiment and advantages will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
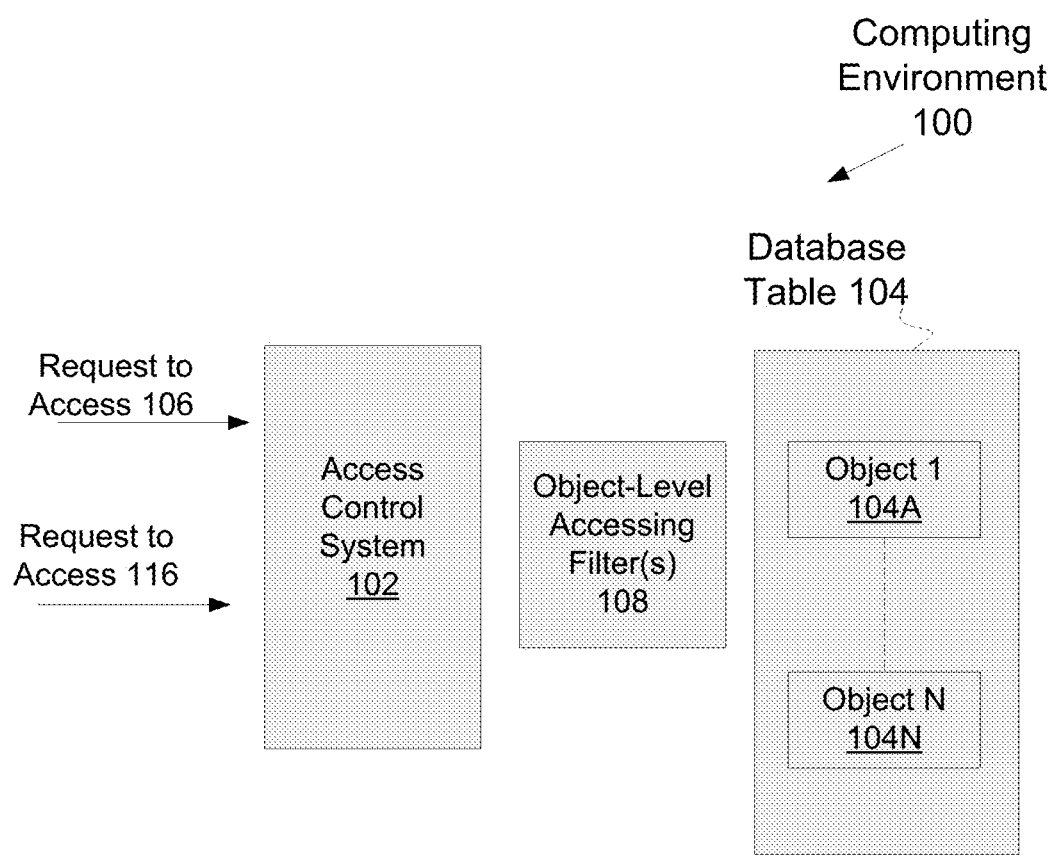
FIG. 1 depicts an access (or data access) control system for providing object-level control access to data objects (or objects) of a database table in a computing environment, in accordance with one embodiment.

As noted in the background section, in view of the ever-increasing need to process more and more data for various applications in many different computing environments and systems, improved techniques for management of access to data of database systems, especially in Massively Parallel Processing (MPP) database systems, would be very useful.

To further elaborate, as of late, there is a growing trend to leverage relatively cheaper data storages (e.g., data lakes, such as AWS S3) for storage of more and more data. The stored data can be used for relatively more complex database systems, or database management systems (e.g., Teradata database systems). In doing so, stored data can be organized as data objects (or "objects") or "object chunks," before it is associated to a "bucket" and/or "container" of a storage that can be typically provided as an external storage at a cheaper cost, as those in the art will appreciate. Also, in context of the database system operations, typically, write operations on the data objects are not done "in-place" (i.e., data objects are logically deleted, and new versions of the data objects are inserted). In other words, in place of each modified data object, there would be, for example, two (2) data objects with different version, with one version corresponding to a pre-modification version, and another version corresponding to a post-modification version.

Today, in the context of locking mechanisms used, only database table level (or table-level) locks are placed on database tables of databases, for example, in data stored in Native Object Store (NOS) database tables. NOS is a relatively recent development that can provide additional advantages. As such, it could serve as a good example for discussion in connection with the improved data access management techniques.

A Native Object Store (NOS) can, for example, be provided in line with and/or as described, by "Teradata Vantage™—Native Object Store Getting Started Guide" (see, for example, "https://docs.teradata.com/r/EK02hHM-782ghx133Qdd67g/root,") as published on Dec. 22, 2021, which is hereby incorporated by reference herein in its entirety and for all purposes). A Native Object Store (NOS) can be a Vantage capability that enables Business Analysts, System Administrators, and Database Administrators to perform read-only searches and query CSV, JSON, and Parquet format datasets located on external S3-compatible object storage platforms using standard Teradata SQL and APIs.

To further elaborate, a Native Object Store (NOS) can enable one or more of the following: Analyzing data stored on an external object store, Reading data in CSV, JSON, or Parquet format stored on an external object store, Joining or aggregating external data to relational data stored in Advanced SQL Engine, Querying cold data offloaded to an external object store, Loading data from external object store into the database using one SQL request, and Writing Advanced SQL Engine data (from tables and derived results) to external object store (see, for example, "Teradata Vantage™—Native Object Store Getting Started Guide").

However, in modern databases environments using data objects or data chucks (e.g., a Native Object Store (NOS) environment) having table-level locks can adversely affect concurrency, as even concurrent requests accessing a completely disjoint set of data objects can be needlessly blocked with a table-level lock as a lock that is effectively placed on the entire content of the database table and consequently all of the data objects of the database table. For example, in the context of Native Object Store File System (NOSFS), metadata information (e.g., min/max, unique values, number of non-null values) are captured at an object level. In addition, the same information could be captured even for NOS tables, using, for example, an existing form of catalog services (e.g., AWS Glue). In any case, given that a rich set of information can be made available today, data objects involved and useful for processing data requests could also be identified with a greater precision today. A such, it would highly beneficial to have object-level locks. Object-level locks can, among other things, improve concurrency of data access, especially in database environments where many requests for access to data objects (e.g., read, write, update, delete, insert) can be made at same time by many different entities and processes (e.g., many entries requesting many database quarries at the same time).

An object-level (or data object-level) locking mechanism would allow selective object-level locking of only data objects (or objects) of a database table, for example, a managed NOS database table to which access is sought by a database query (q1). This means that other data objects of the same database table would need not be needlessly locked, and can be made available for concurrent access by other database queries, regardless of the locking mode on the data objects accessed by the database query (q1).

In other words, with selective object-level locking, only the data objects that are accessed by a database query need to be locked in accordance with one aspect. This allows highly concurrent access to separate portions (or objects) of data in a database table. For example, if a database query q1 requires a write lock for updating and/or deleting data from a data object group g1 (subset of data objects corresponding to the database table), but a second query q2 requires a write lock on a second data object group g2, the incompatibility between the needed lock types will not result in a delay of processing of the database queries because the database table would not be wholly (or completely) locked on behalf of only one of the database queries. Therefore, both of the first and second database queries (q1 and q2) can run concurrently, using the same database table in a safe manner. However, without selective object-level locking, conventionally, the entire database table would be locked and access for the objects would have to be needlessly serialized with respect to the table, thereby not allowing concurrent access to the data. Accordingly, it will be appreciated that an object-level data access mechanism can be provided in accordance with one aspect. The object-level data access mechanism can effectively provide an object-level locking mechanism for locking data objects of database tables, individually, as individual data objects.

Although providing an object-level locking mechanism would be highly desirable for at least the reasons noted above. Achieving object-level locking mechanism in a feasible manner can be even more challenging for at least some applications. To elaborate, providing a fine-grain locking mechanism (i.e., at the object level) using more traditional locking mechanisms may not be ideal, if not impractical, at least for some applications due the additional overhead and inefficiencies that would be incurred by using more traditional locking mechanisms. Consequently, there is also a need for solutions that could overcome these additional challenges as well.

As such, it will be appreciated that an object-level filtering mechanism can be provided in accordance with one another aspect. instead of an object-level locking mechanism using more conventional locks. The Filtering mechanism could significantly, if not dramatically, decrease the overhead and inefficiencies that would be incurred by using more traditional locking mechanisms.

To that end, improved data access management techniques further provide an object-level accessing filtering mechanisms in accordance with another aspect. The object-level accessing filtering mechanisms can also effectively provide an object-level locking mechanisms for locking data objects of a database table, individually (i.e., as individual locks placed on individual data objects). Moreover, the object-level accessing filtering mechanisms can be provided in a more efficient manner, as a space-efficient filtering mechanism that may allow false positives but not false negatives (e.g., a bloom filter, a cuckoo filter) thereby allowing secure but space efficient object-level locking mechanism for controlling access to each one of the multiple data objects of the database table, individually.

A set of filters (e.g., write and read) can be provided for a database table in accordance with another aspect. By way of example, a database management system can use a read cuckoo filter and a write cuckoo filter to facilitate concurrent database operations in a safe but efficient manner, in accordance with one embodiment.

Embodiments of some aspects of the improved techniques are also discussed below with reference to FIGS. 1-5. However, those skilled in the art will readily appreciate that the detailed description given herein with respect to these figures is for explanatory purposes as the invention extends beyond these limited embodiments.

FIG. 1 depicts an access (or data access) control system 102 for providing object-level control access to data objects (or objects) of a database table 104 in a computing environment 100, in accordance with one embodiment. The access control system 102 can, for example, be provided as a computer system that includes one or more physical processors (not shown) configured to access memory (not shown) storing at least computer executable program code, as it will be readily appreciated by those skilled in the art. For example, the access control system 102 can be provided, as (or in) a database management system (not shown) configured to access a database (not shown) that includes the database table 104. It should be noted that the data objects 104 could be stored internally, or externally, for example, as a NOS (described above).

Referring to FIG. 1, the access control system 102 can use one or more object-level filters 108 provided for the database 104. More specially, the one or more object-level filters 108 effectively provide an object-level locking mechanism for controlling access to each one of multiple data objects of the database table (104A-104N), individually. In doing so, a request to access 106 can be processed, as request to access the database table 104, by the access control system 102, based on the individual data objects involved in the request to access 106. For example, if the request to access 106 is a request to access a first data object (104A) but does not request to access another data object in the database 104, for example, data object 104 N, the access control system 102 would not needlessly put a lock on the data object 104N, as it would be done conventionally when the entire database table 104 would be locked. In other words, in response to a request to perform an operation (e.g., read, write, update, delete) on the first data object 104A via the request to access 106, the access control system 102 can effectively use the object-level accessing filter(s) 108 to safely perform the requested operation on the first data object 104A without needlessly locking up other data objects in the database table 104, thereby allowing another request to access, for example, a second request to access 116 to access the data object(s) not affected by the first request to access 106.

By way of example, the object-level accessing filter(s) 108 can be provided based on a determination of whether the first data object 104A is a member of a set. In addition, this determination can be implemented as an efficient filtering mechanism that can return a false positive (generally with low probability), but not a return a false negative (e.g., as a cuckoo filter), thereby allowing a secure but space efficient object-level locking mechanism for controlling access to each one of the multiple objects (104A-104N) of the database table 104, individually. The object-level accessing filter(s) 108 can, for example, be provided as a set of filters defined for read and write operations (i.e., a read filter and a write filter). For example, the object-level accessing filter(s) 108 can be provided as a set of cuckoo filters, namely a write cuckoo filter and a read cuckoo filter for the database table 104, as it will be described in greater detail in accordance with one embodiment.

Referring again to FIG. 1, it should be noted that by using the object-level accessing filter(s) 108, the access control system 102 can safely process concurrent access requests, namely a first request to access 106 and a second request to access 116, such that access to the database table 104 can be safely controlled concurrently on an object-level basis. In doings, concurrent access requests 106 and 116 are not blocked unless the same data object of the database table 104 is being requested by the request to access 106 and request to access 116. This allows modifying non-conflicting data objects concurrently. In addition, database table level metadata and version information can be effectively serialized, for example, by applying a table-level write lock, as will be described in greater detail below in connection of other exemplary embodiments.

Figure 2:
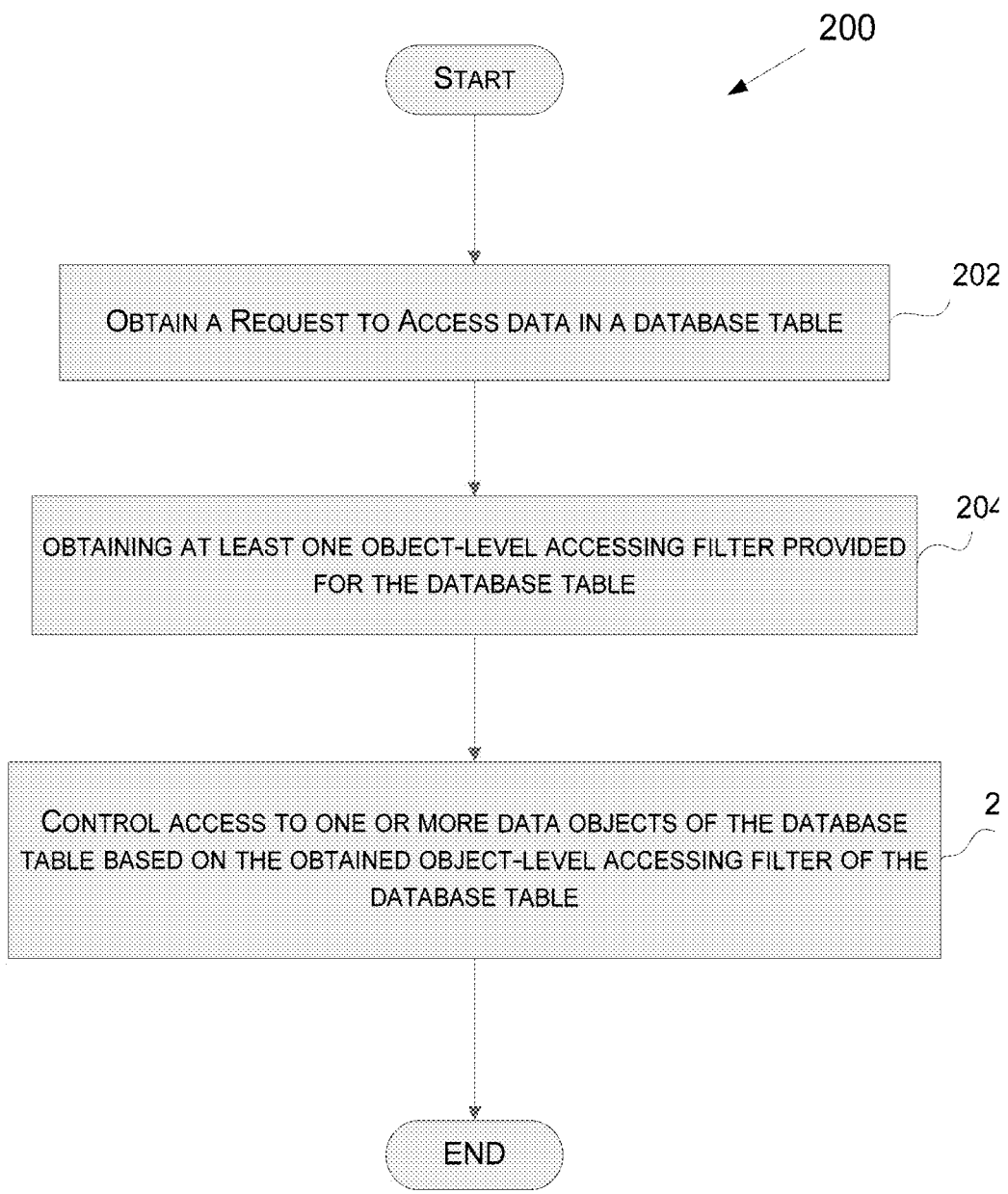
FIG. 2. depicts a method for controlling access to (shared) data objects of a database table in accordance with one embodiment.

However, referring now to FIG. 2, a method 200 for controlling access to (shared) data objects of a database table is depicted in accordance with one embodiment. It should be noted that the data objects are typically shared objects stored in a database (e.g., as multiple shared data objects in a database table stored on multiple external storages). The method 200 can, for example, be performed by the access control system 102 (shown in FIG. 1).

Referring to FIG. 2, initially, a request to access data of a database table of a database is obtained 202 (e.g., received, identified) as input. The request to access data is a request to access one or more data objects of the database (e.g., one or more particular data objects of multiple data objects stored as or in a database table). Typically, the request to access data is, or includes, a request to perform one or more operations on one or more data objects in a database table (e.g., read, write, update, delete, create, insert). In response to the obtained (202) request to access the data, including, for example, a first data object, at least one object-level accessing filter provided for the database table is obtained (204). It should be noted that one or more object-level accessing filters are provided for controlling (or configured to control) access to the multiple data objects of the database table of the database, including the first data object referenced by the request to access the data. As such, access can be controlled individually, as individual data objects of the database table. In other words, the object-level accessing filter effectively provides an object-level locking mechanism for controlling access to each one of multiple data objects of the database table, including the first data object is the subject of the request to access data, individually, as individual data objects of the database table. Accordingly, access to the first data object is controlled (206), based on the obtained one or more object-level accessing filters provided for the database table. For example, the access to a first data object of a database table can be effectively locked, but access to a second data object in the same database table is not needlessly locked is there is no conflict presented by another concurrent request to access the same data object.

It should be noted that an object-level accessing filter can at least allow a determination of whether the first data object is a member of a set, in order to determine whether access to the first database object should be granted. In addition, the determination of whether the first data object is a member of a set can return a false positive but cannot return a false negative, thereby allowing a secure but space efficient object-level locking mechanism for controlling access to each one of the multiple objects of the database table (e.g., a cuckoo filter). The object-level accessing filter can, for example, be provided as, or include, a set of filters (e.g., a read filter, a write filter) provided for the database table. In doing so, a determination can be made as to whether on or more data objects are members of one or more set. This determination can, for example, be made as a probabilistic determination that can be a false positive but not a false negative (e.g., a bloom filter, a cuckoo filter). This guarantees that a concurrent write access is not possible if a conflicting lock exists. After non-conflicting data objects are modified concurrently, table level metadata and version information can be sterilized, for example, by effectively applying a table-level write lock.

Cuckoo Filters as an Example

As noted above, an object-level filter (e.g., object-level accessing filter 108 depicted in FIG. 1) can, for example, be provided as a cuckoo filter in a database system in an accordance with one embodiment. For illustrations, improved techniques for controlling access to databases will now be described in greater detail in context of cuckoo filter by first providing an introduction to cuckoo filters.

A cuckoo filter can be defined as a "space-efficient probabilistic data structure that is used to test whether an element is a member of a set" (see, for example,"" as published on Dec. 22, 2021, which is hereby incorporated by reference herein in its entirety and for all purposes).

A cuckoo filter is similar to a "Bloom Filter." A Bloom filter can be defined as a space-efficient probabilistic data structure, conceived by Burton Howard Bloom in 1970, that is used to test whether an element is a member of a set. False positive matches are possible, but false negatives are not— in other words, a query returns either "possibly in set" or "definitely not in set". Elements can be added to the set, but not removed (though this can be addressed with the counting Bloom filter variant); the more items added, the larger the probability of false positives (see, for example, "https://en.wikipedia.org/wiki/Bloom_filter" as published on Dec. 22, 2021, which is hereby incorporated by reference herein in its entirety and for all purposes).

Similarly, a cuckoo filter can be provided a space-efficient probabilistic data structure that is used to test whether an element is a member of a set, where false positive matches are possible, but false negatives are not. In other words, a query can return either "possibly in set" or "definitely not in set". However, a cuckoo filter can also delete existing items, which is not typically supported by Bloom filters. In addition, for applications that store many items and target moderately low false positive rates, cuckoo filters can achieve lower space overhead than space-optimized Bloom filters.

As it has also been described, for example, by "https://en.wikipedia.org/wiki/Cuckoo_filter" as published, on Dec. 22, 2021: "A cuckoo filter uses a n-way set-associative hash table based on cuckoo hashing to store the fingerprints of all items (every bucket of the hash table (or hashtable) can store up to n entries). Particularly, the two potential buckets in the table for a given item x required by cuckoo hashing are calculated by the following two hash functions (termed as partial-key cuckoo hashing):

$$h_1(x)=\text{hash}(x)$$

$$h_2(x)=h_1(x)\oplus\text{hash}(\text{fingerprint}(x))$$

Applying the above two hash functions to construct a cuckoo hash table enables item relocation based only on fingerprints when retrieving the original item is impossible. As a result, when inserting a new item that requires relocating an existing item y, the other possible location j in the table for this item y kicked out from bucket i is calculated by:

$$j=i\oplus\text{hash}(\text{fingerprint}(y))$$

Based on partial-key cuckoo hashing, the hash table can achieve both high-utilization, and compactness because only fingerprints are stored. Lookup and delete operations of a cuckoo filter are straightforward. There are a maximum of two locations to check by $h_1(x)$ and $h_2(x)$. If found, the appropriate lookup or delete operation can be performed in O(1) time." ("https://en.wikipedia.org/wiki/Cuckoo_filter" as published, on Dec. 22, 2021)

Cuckoo Filters for Object-Level Locking

In accordance with one aspect, a number of table-level cuckoo filters can be provided and maintained for one or more database tables of a database. For example, in accordance with one exemplary embodiment, two (2) table-level cuckoo filters can be provided, namely, one for readers Cr and another for writers Cw. In other words, two table-level cuckoo filters can be provided for each table of a database of interest, a read cuckoo filter Cr and a write cuckoo filter Cw.

In the exemplary embodiment, a reader would need to look up the write cuckoo filter Cw before being allowed to read an object. The reader could proceed to read an object when allowed (if and when there is no conflict) by making an entry into the read cuckoo filter Cr. As such, the reader may have to wait when there is a conflict.

Similarly, in the exemplary embodiment, in case of a write request, the read cuckoo filter Cr can be looked up, before allowing the writer to perform one or more write operations (e.g., updating, deleting) on the object to ensure there is no conflict. The write requester would also attempt to effectively lock the object by making an entry into Cw. It should be noted that if there is a conflict when the cuckoo filter Cr, or the write cuckoo filter Cw, is effectively probed, the write request would be blocked until there is no conflict. In accordance with one embodiment, cuckoo filters can be treated as part of critical section. As such, operations on cuckoo filters can proceed in a serialized manner (i.e., no two requests can access either one the cuckoo filters in parallel) as will be appreciated by those skilled in the art.

In one exemplary embodiment, a reader or writer would proceed concurrently, only if an appropriate lock (read or write) is effectively obtained based on the corresponding cuckoo filter (read or write). The lock can be effectively obtained on all of the objects required for processing the request, when, for example, the list of objects to be read or written can be identified before processing the request, so that the corresponding object's hash could be inserted into the corresponding cuckoo filters (i.e., so that lock could be effectively acquired only on the key spool or filtered object names based on the metadata or similar other information in case of NOS tables as will be appreciated to those skilled in the art).

Upon probing both cuckoo filters, if it is determined based on the cuckoo filter that there is no lock on an object, then it is certain that no lock has been taken on the object, therefore a concurrent writer can go ahead to modify the object. However, given that false positives are possible (with a relatively low probability), it can be determined based on a cuckoo filter that there is a lock on an object even though that is not really the case. This would be a worst-case scenario. However, worst-case scenario would be similar to taking a write lock on a database table till the lock conflict is resolved as would be done using conventional locking mechanisms that lock the entire table.

It should be noted that even if there is a parallel insert along with update/delete, inserted objects will not be qualified/considered for update/delete query as they are not yet committed.

Inserts

Generally, inserts need not take any locks (i.e., no object level locks or no new inserts in to the cuckoo filters). For NOSFS environment, only at the time of creating a root, concurrent inserts need to be serialized. In other words, there is a need to serialize the version number update. For example, if there are two inserts w1 and w2, with w1 inserting three (3) leaves l1, l2, and l3, and w2 inserting three leaves l4, l5, and l6, at the time of creating root, if w1 and w2 are serialized, w1 could create a root with entries corresponding to l1, l2 and l3, which would be used subsequently by w2 to append l4, l5 and l6.

Updates and Deletes

Concurrent deletes could go on once it's clear that there is no conflict based on any of the cuckoo filters. Typically, there is a need to serialize the version number update. In case of and update: if there is a concurrent update, additional objects could qualify once the concurrent update is committed. If there is a concurrent insert, additional objects could qualify once the concurrent insert is committed.

In case of delete: if there is a concurrent update, additional objects could qualify once the concurrent update is committed. If there is a concurrent insert, additional objects could qualify once the concurrent insert is committed.

Additional Exemplarily Embodiments

Figure 3:
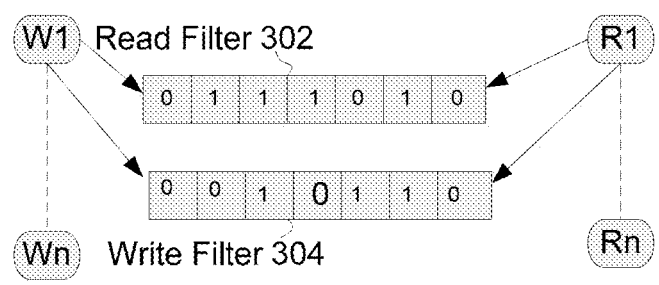
FIG. 3 depicts a read cuckoo filter and a write cuckoo filter provided for a database table in accordance with exemplary embodiment.

To elaborate even further, FIG. 3 depicts a read cuckoo filter 302 and a write cuckoo filter 304 provided for a database table in accordance with exemplary embodiment. Referring to FIG. 3, the read cuckoo filter 302 and write cuckoo filter 304 are each represented, conceptually, with multiple entries, each corresponding to a data object of a database, such that each one of the entries can be set with a binary value (e.g., one and zero) to indicate an access status of its respective data object in the database table. In the example depicted in FIG. 3, multiple readers (R1-Rn) and multiple writers (W1-Wn) can seek access to the database table protected by the read and write filters 302 and 304, concurrently. In doing so, the access status of a data object can be determined based on its access status indicated by its corresponding entry in the read and write filters 302 and 304 (e.g., locked/open, allowed/denied, or conflict/no conflict). It should be noted that the access status of a data object in the read cuckoo filter 302 can be set to indicate a conflict (e.g., set to "1") only by a reader (R1-Rn) in accordance with one embodiment. Similarly, the access status of a data object in the write cuckoo filter 304 can be set to indicate a conflict only by a writer (W1-Wn).

For example, assuming there are one thousand (1000) objects corresponding to a NOS database table, and five (5) concurrent writers seeking to performs various operations (e.g., combinations of insert, update, and delete) each on one hundred (100) independent set of data objects of a database table. In the example, let the current version number be One (1). All pf the five (5) writers can concurrently update their set of one hundred (100) data objects. When a first writer (w1) is done with its operations (e.g., update), updating the version number can be serialized, such that the first writer (w1) would take, for example, a row hash lock on a dictionary row and updates the current version number to be two (2) from version number one (1). At the last phase of the concurrent operations (e.g., update), a second concurrent writer w2, cam find out that it started with current version number one (1), but the version number is current two (2) (at the last phase). As a result, the second concurrent writer w2 can pick up the one hundred (100) objects updated by the first writer w1 (in case of NOSFS, leveraging the base physical a Universally Unique Identifier ("uuid") which would be same for all of the 100 objects created by w1 as part of version 2). The second concurrent writer w2 also effectively places a write lock on the dictionary row corresponding to the database table and processes (dispatcher reruns the update operations) the one hundred (100) objects updated by the first write w1. In case of NOSFS, the one hundred (100) objects could be further filtered out based on the metadata available in the index entries. In addition, while the second writer w2 processes the additional one hundred (100) objects, a third writer, a fourth writer, and a fifth writer (w3, w4, and w5) can be blocked given the write lock effectively placed on the dictionary row.

Figure 4:
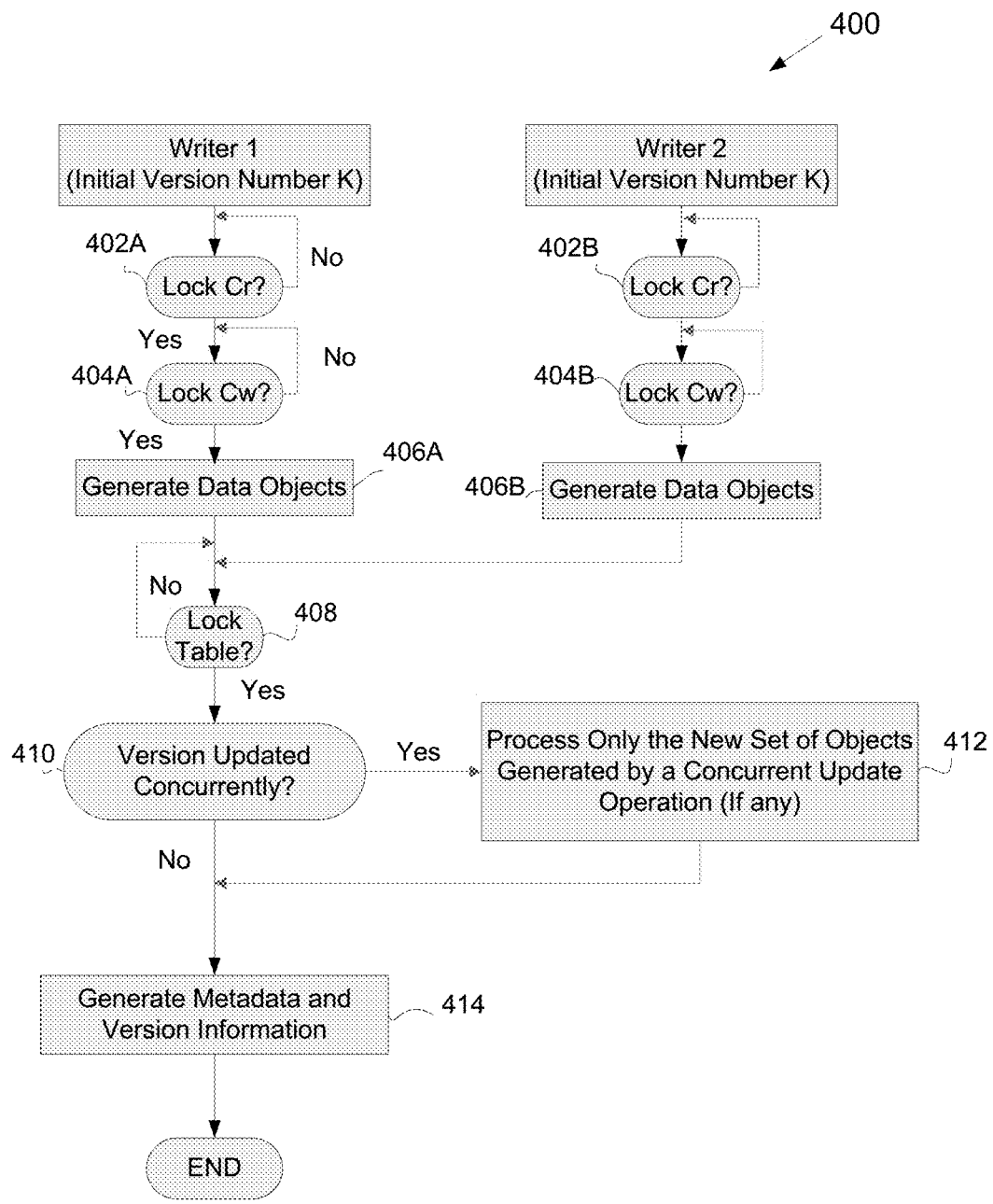
FIG. 4 depicts a method for performing exemplary write operations in accordance with one embodiment.

To elaborate even further, FIG. 4 depicts a method 400 for performing exemplary write operations in accordance with one embodiment. Referring to FIG. 4, the write operations are depicted in connection with two concurrent writers in connection with cuckoo filters (Cr and Cw) provided for a database table in accordance to one embodiment. Referring to FIG. 4, each one the two writers (writer 1 and writer 2) can effectively check a read cuckoo filer (402 A and 402B) provided for a database table. Accordingly, writer 1 and writer 2 can each be blocked until it is determined (402 A and 402 B) that there is no conflict. Thereafter, writer 1 and writer can proceed to check a write cuckoo filer (404 A and 404B) and wait in case there is a conflict in a similar manner as noted above before one or more data objects are generated (406 A and 406B). After one or more data objects are generated (406 A and 406B) writer 1 and writer 2 can effectively wait (408) unit it is determined that there is no lock on the database table before it is determined (410) whether the version number has been updated concurrently. If it is determined (410) that the version number has been updated concurrently, then only a new set of objects, if any, that were generated by the concurrent update are processed (412) before metadata and version information is generated (414).

Figure 5:
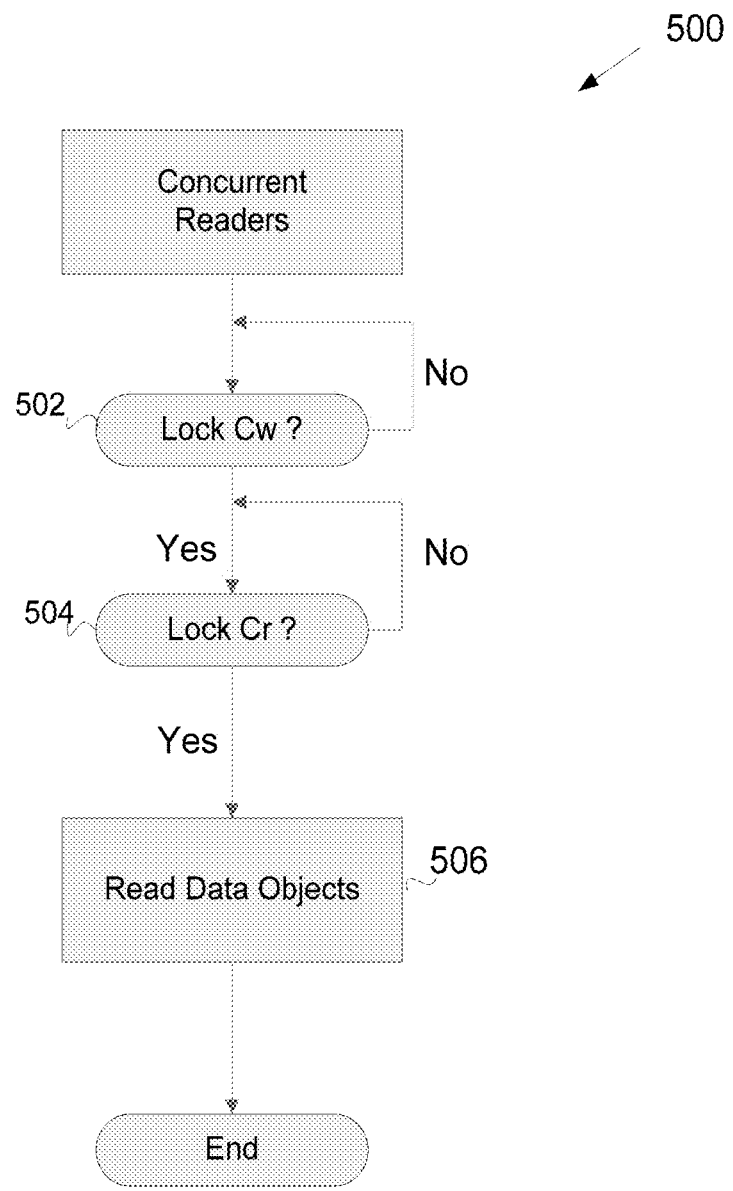
FIG. 5A depicts a method for performing exemplary read operations in accordance with one embodiment.

To elaborate even further, FIG. 5 depicts a method 500 for performing exemplary read operations in accordance with one embodiment. The read operations can be performed by concurrent readers in connection with cuckoo filters (Cw and Cr) provided for a database table in accordance to one embodiment. Referring to FIG. 5, a concurrent reader can first check (502) a cuckoo write filter before checking (502) a cuckoo read filter. As such, a concurrent reader can be blocked (502) first based on a cuckoo write filter if there is a conflict. When there is no conflict is detected (502) based on the cuckoo write filter, the reader can proceed, but it can again can be blocked (504) if a conflict is detected based on the cuckoo read filter. If and when it is determined (504) that there is no conflict based on the cuckoo read filter either, then the reader can proceed to read one or more data object of the database table.

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of controlling access to data objects of a database table stored in a database, wherein the computer-implemented method comprises:
   obtaining a first request to access data of the database table of the database, wherein the request to access data includes a request to access a first data object of multiple data objects of the database table of the database;
   in response to the request to access the data of the database table, obtaining at least one object-level accessing filter for the database table, wherein the at least one object-level accessing filter is configured to control access to the multiple data objects of the database table of the database, individually, at an object level, as individual data objects of the database table, wherein the at least one object-level accessing filter effectively provides an object-level locking mechanism for controlling access to each one of the multiple data objects of the database table, including the first data object and a second data object of the database table of the database, individually, as individual data objects of the database table; and
   controlling access to the database table at the object level, based on the obtained at least one object-level accessing filter, by at least: (i) controlling access to the first data object of the database table of the database, as an individual data object, and (ii) controlling access to the second data object of the database table of the database.

2. The computer-implemented method of claim 1, wherein the computer-implemented method comprises:
   using the least one object-level accessing filter to effectively lock access to the first database object but not locking access to the second database object of the multiple database objects of the database table.

3. The computer-implemented method of claim 2, wherein the least one object-level accessing filter at least allows a determination of whether the first data object is a member of a set, in order to determine whether access to the first database object should be granted.

4. The computer-implemented method of claim 3, wherein the determination of whether the first data object is a member of a set can return a false positive but cannot return a false negative, thereby allowing a secure but space efficient object-level locking mechanism for controlling access to each one of the multiple data objects of the database table, individually.

5. The computer-implemented method of claim 1, wherein the least one object-level accessing filter includes at least one cuckoo filter provided for the database table in order to control access to each one of the multiple data objects of the database table, individually.

6. The computer-implemented method of claim 1, wherein the at least one object-level accessing filter includes a read filter and a write filter provided for the database table.

7. The computer-implemented method of claim 1, wherein the at least one object-level accessing filter includes a read cuckoo filter and a write cuckoo filter.

8. The computer-implemented method of claim 1, wherein the data objects of the database table are stored as multiple shared data objects on multiple external storages that are external with respect to a database system that effectively controls access to the database.

9. The computer-implemented method of claim 1,
wherein the data objects are stored as shared objects that can be accessed concurrently; and
wherein the computer-implemented method further comprises:
obtaining multiple concurrent requests to access the data of the database table; and
determining, based on the obtained at least one object-level accessing filter of the database table, whether to grant or deny access to each one of the multiple concurrent requests to access the data of the database table.

10. The computer-implemented method of claim 9, wherein the determining of whether to grant or deny access further comprises:
effectively determining if the concurrent requests are attempting to access the same data object concurrently.

11. The computer-implemented method of claim 9, wherein the determining of whether the concurrent requests are attempting to access the same data object concurrently comprises:
determining if one or more data objects are a member of one or more sets.

12. The computer-implemented method of claim 11, wherein the determining of one or more data objects are a member of one or more sets is a probabilistic determination that can be a false positive but not a false negative, thereby guarantying that a current write access is not possible is a conflicting lock exists.

13. The computer-implemented method of claim 9, wherein the computer-implemented method comprises:
modifying two or more data objects of the database concurrently when it is determined that there is not a conflict between the two or more data objects, wherein the two or more data objects are referenced by the multiple concurrent requests to access the data of the database table.

14. The computer-implemented method of claim 13, wherein the computer-implemented method comprises:
updating the metadata and/or at least one version number associated with the two or more data objects in a serial manner by at least applying a write lock the database table that effectively prevents writing into the database table.

15. A computing system that includes one or more processors configured to control access to data stored in a database, wherein the one or more processors are further configured to:
obtain a first request to access data of the database table of the database, wherein the request to access data includes a request to access a first data object of multiple data objects of the database table of the database;
in response to the request to access the data of the database table, obtain at least one object-level accessing filter for the database table, wherein the at least one object-level accessing filter is configured to control access to the multiple data objects of the database table of the database, individually, at an object level, as individual data objects of the database table, wherein the at least one object-level accessing filter effectively provides an object-level locking mechanism for controlling access to each one of the multiple data objects of the database table, including the first data object, individually, as individual data objects of the database table; and
control access to the database table at the object level, based on the obtained at least one object-level accessing filter, by at least controlling access to the first data object as an individual data object.

16. The computing system of claim 15, wherein the one or more processors are further configured to:
effectively lock access to the first data object but not locking access to a second database object of the multiple database objects of the database table.

17. The computing system of claim 15, wherein the least one object-level accessing filter at least allows a determination of whether the first data object is a member of a set, in order to determine whether access to the first database object should be granted.

18. The computing system of claim 15, wherein the determination of whether the first data object is a member of a set can return a false positive but cannot return a false negative, thereby allowing a secure but space efficient object-level locking mechanism for controlling access to each one of the multiple data objects of the database table, individually.

19. A non-transitory computer readable medium storing at least executable computer code, wherein the executable computer code includes:
executable computer code configured to obtain a first request to access data of the database table of the database, wherein the request to access data includes a request to access a first data object of multiple data objects of the database table of the database;
executable computer code configured to obtain at least one object-level accessing filter for the database table, wherein the at least one object-level accessing filter is configured to control access to the multiple data objects of the database table of the database, individually, at an object level, as individual data objects of the database table, wherein the at least one object-level accessing filter effectively provides an object-level locking mechanism for controlling access to each one of the multiple data objects of the database table, including the first data object, individually, as individual data objects of the database table; and executable computer code configured to control access to the database table at the object level, based on the obtained at least one object-level accessing filter, by at least controlling access to the first data object as an individual data object.

20. The non-transitory computer readable medium of claim 19, wherein the executable computer code also includes:

executable computer code configured to effectively lock access to the first data object but not locking access to a second database object of the multiple database objects of the database table.

* * * * *